(12) United States Patent
Zaghib et al.

(10) Patent No.: US 9,972,865 B2
(45) Date of Patent: May 15, 2018

(54) RECHARGEABLE ELECTROCHEMICAL ACCUMULATOR

(75) Inventors: Karim Zaghib, Longueuil (CA); Michel Perrier, Montreal (CA); Abdelbast Guerfi, Brossard (CA); Elizabeth Dupuis, Sainte-Angèle de Monnoir (CA); Patrick Charest, Ste-Julie (CA)

(73) Assignee: HYDRO-QUEBEC, Montreal (CA)

( * ) Notice: Subject to any disclaimer, the term of this patent is extended or adjusted under 35 U.S.C. 154(b) by 1706 days.

(21) Appl. No.: 10/543,885

(22) PCT Filed: Jan. 29, 2004

(86) PCT No.: PCT/CA2004/000129
§ 371 (c)(1),
(2), (4) Date: Dec. 22, 2006

(87) PCT Pub. No.: WO2004/068610
PCT Pub. Date: Aug. 12, 2004

(65) Prior Publication Data
US 2007/0111105 A1 May 17, 2007

(30) Foreign Application Priority Data

Jan. 30, 2003 (CA) ..................................... 2418257

(51) Int. Cl.
*H01M 10/00* (2006.01)
*H01M 10/0566* (2010.01)
(Continued)

(52) U.S. Cl.
CPC ....... *H01M 10/0566* (2013.01); *H01M 6/168* (2013.01); *H01M 10/0436* (2013.01);
(Continued)

(58) Field of Classification Search
CPC ............. H01M 6/168; H01M 10/0436; H01M 10/0566; H01M 10/0567; H01M 10/4235;
(Continued)

(56) References Cited

U.S. PATENT DOCUMENTS 4,824,744 A * 4/1989 Kuo et al. ..................... 429/209
5,011,501 A    4/1991 Shackle et al.
(Continued)

FOREIGN PATENT DOCUMENTS

EP    0 858 119 A2    8/1998
EP    0 994 143 A1    4/2000
(Continued)

OTHER PUBLICATIONS

Form PCT/ISA/237 (English version only).
(Continued)

*Primary Examiner* — Stephen J Yanchuk
(74) *Attorney, Agent, or Firm* — Buchanan Ingersoll & Rooney P.C.

(57) ABSTRACT

The invention relates to a metallic lithium rechargeable electrochemical accumulator, comprising at least one lithium metal electrode and at least one polymeric electrolyte gel. Said accumulator is capable of operating at temperatures from −20 to 60° C., essentially without formation of lithium dendrites on the whole surface of the metallic lithium electrode. The above is also wherein a particularly long life, even with intensive use at low temperature. Said inventive rechargeable accumulator can be produced by use of a production method with particular application of temperature control during the specific production stages. As a result of the extremely high electrochemical performance of said accumulator, in particular the remarkable stability thereof, said accumulator can be used in new application (Continued)

fields such as hybrid vehicles, electric vehicles and emergency supply systems such as those of the UPS type.

26 Claims, 6 Drawing Sheets (51) Int. Cl.
  $H01M\ 6/16$ (2006.01)
  $H01M\ 10/04$ (2006.01)
  $H01M\ 10/0567$ (2010.01)
  $H01M\ 10/42$ (2006.01)
  $H01M\ 2/16$ (2006.01)
  $H01M\ 4/134$ (2010.01)
  $H01M\ 10/052$ (2010.01)

(52) U.S. Cl.
  CPC ... *H01M 10/0567* (2013.01); *H01M 10/4235* (2013.01); *H01M 2/1653* (2013.01); *H01M 4/134* (2013.01); *H01M 10/052* (2013.01); H01M 2300/0037 (2013.01); H01M 2300/0042 (2013.01); H01M 2300/0085 (2013.01); Y02E 60/122 (2013.01); Y02P 70/54 (2015.11)

(58) Field of Classification Search
  CPC .. H01M 10/052; H01M 2/1653; H01M 4/134; H01M 2300/0037; H01M 2300/0042; H01M 2300/0085; Y02T 10/7011
  USPC ................................................. 429/188–208
  See application file for complete search history.

(56) References Cited

U.S. PATENT DOCUMENTS

| | | | |
|---|---|---|---|
| 5,100,746 A * | 3/1992 | Muller et al. | 429/94 |
| 6,190,804 B1 | 2/2001 | Ishiko et al. | |
| 6,517,590 B1 | 2/2003 | Gauthier et al. | |
| 6,822,065 B1 * | 11/2004 | Sanchez et al. | 526/329.3 |
| 2001/0004505 A1 | 6/2001 | Hong Gan et al. | |
| 2002/0015894 A1 | 2/2002 | Wariishi et al. | |
| 2002/0182488 A1 | 12/2002 | Cho et al. | |
| 2003/0180624 A1 * | 9/2003 | Oh et al. | 429/313 |
| 2003/0194607 A1 * | 10/2003 | Huang | 429/176 |
| 2004/0122178 A1 * | 6/2004 | Huang et al. | 525/221 |
| 2004/0151985 A1 * | 8/2004 | Munshi | 429/309 |
| 2005/0234177 A1 | 10/2005 | Zaghib et al. | |

FOREIGN PATENT DOCUMENTS

| | | |
|---|---|---|
| EP | 1 123 948 A1 | 8/2001 |
| EP | 1 164 654 A2 | 12/2001 |
| EP | 1 213 778 A2 | 6/2002 |
| JP | 2002-203604 | 7/2002 |
| WO | 03/063287 A2 | 7/2003 |

OTHER PUBLICATIONS

Dey, A.N., "Electrochemical Alloying of Lithium in Organic Electrolytes," *Journal of the Electrochemical Society Electrochemical Science*, Oct. 1971, pp. 1547-1549, vol. 118, No. 10, Electrochemical Society, Pennington, NJ, USA.

Office Action dated Sep. 3, 2008, by the European Patent Office in corresponding European Patent Application No. 04 706 112.2. (3 pages).

* cited by examiner

EXAMPLE LAMINATION AT 25 °C AND CROSSLINKING AT 80 °C

RECHARGEABLE ELECTROCHEMICAL ACCUMULATOR

FIELD OF THE INVENTION

The present invention relates to a metallic lithium rechargeable electrochemical accumulator comprising at least one electrode of the metallic lithium type and at least one polymeric gel electrolyte.

This invention also relates to a preparation process for this accumulator and to its use notably as a current source in hybrid electric vehicles, electric vehicles and UPSs.

BRIEF DESCRIPTION OF THE PRIOR ART

The use of metallic lithium in $MnO_2$-based primary batteries as a cathode is known. These batteries are used in the electronics field, for example in watches for memory backup. Due to the formation of lithium dendrites, these batteries are not rechargeable. This undesirable phenomenon seems to be caused by the use of liquid electrolytes associated with this technology.

A technology known as ACEP was developed by Hydro-Québec in an effort to solve the problem of dendrite formation. However, this technology, which uses a dry polymer, has only partially solved this problem since the normal operating temperature of this technology remains above 60° C.

U.S. Pat. No. 6,190,804 in the name of Dai-Ichi Kogyo Seiyaku Co. describes electrochemical accumulators comprising a solid electrolyte. The solid electrolyte is obtained by dissolving a tetrafunctional compound of specific formula and high molecular weight with an electrolytic salt in a solvent, then crosslinking the solution.

Accumulators produced according to the technology described in this patent present the inconvenience of only being able to operate at temperatures considered high.

U.S. Pat. No. 6,517,590 in the name of Hydro-Québec describes the use of lubricant agents to improve performance of the lamination stage of the film constituting the electrode and of the film covering the anode. However, the accumulators described in this document have also a limitation in terms of their low temperature use.

The international application WO 03/063 287 in the name of Hydro-Québec describes a polymer electrolyte that can be in gel form and presenting an electrochemical stability above 4 volts when used as an electrolyte in hybrid supercapacitors and electrochemical accumulators. The corresponding lithium accumulators, however, have the disadvantage of exhibiting lithium dendrite formation during battery recharging.

Thus a new rechargeable accumulator is needed, one that does not have the disadvantages generally associated with the electrochemical systems of the prior art.

There is also a need for a rechargeable accumulator that has a prolonged life time and is stable even at uncommon operating conditions such as temperatures below 60° C. and even as low as −20° C.

SUMMARY OF THE INVENTION

The present invention meets the needs described above by providing a metallic lithium rechargeable electrochemical accumulator comprising at least one electrode of the metallic lithium type and at least one polymeric gel electrolyte. This accumulator can operate at temperatures between −20° C. and 60° C., essentially without formation of lithium dendrites on the entire surface of the electrode of the metallic lithium type. It is also characterized by a remarkable long life, even with intensive use at low temperatures.

The accumulator according to the invention is thus very stable during operation and has a particularly long lifetime that is associated with, notably, a near-absence of lithium dendrite formation, even in unfavorable use conditions such as frequent cycling at low temperatures, below 60° C.

This new rechargeable accumulator may be obtained by the use of a fabrication process that involves, among others, a control of the temperatures applied at specific stages in the production process.

Due to its very high electrochemical performances, in particular its remarkable stability, this accumulator can be used in new fields of application such as hybrid vehicles, electric vehicles and emergency supply systems such as those of the UPS type. In fact, this new accumulator can be used in all types of applications and even outdoors in cold regions.

The invention as well as its advantages will become more evident upon reading the following detailed and non-restrictive description and by referring to the accompanying figures.

BRIEF DESCRIPTION OF FIGURES

FIG. 1 is a schematic representation of the internal structure of a rechargeable accumulator according to the invention. This accumulator comprises three basic films—a lithium-based anode film, a separator film and a cathode film. It also comprises a SEI (Solid Electrolyte Interface) passivation film formed on the surface of the lithium-based film and on the surface of the cathode film following lamination by crosslinking of an electrolytic composition.

FIG. 6 is a photograph of two pressure devices (presscells) produced by Hydro-Québec One of these devices is shown assembled, the other disassembled with a battery to be tested positioned inside one of its lids. These devices allow the user to control the dynamic pressure exerted on a battery placed inside the device in the correct position. As shown in this figure, they are each constituted of two nestable lids that are secured with four systems of nuts and bolts. When the device is assembled, the piston that passes through one of the lids exerts a pressure on the battery being tested, the piston's displacement being carried out by air uptake.

GENERAL DESCRIPTION OF THE INVENTION

In the framework of the present invention, "polymeric gel electrolyte" refers to a viscoelastic mass formed from a colloidal suspension comprising at least one crosslinkable polymer, at least one plasticizing solvent and at least one lithium salt. The crosslinking rate of the crosslinkable polymer(s) present in the gel is usually situated between 5% and 40% at ambient temperature.

In the framework of the present invention, a "plasticizing solvent of a crosslinkable polymer" refers to an organic compound or a mixture of organic compounds capable of solubilizing the crosslinkable polymer and improving the plasticity of the polymeric gel electrolyte obtained by crosslinking of this crosslinkable polymer, when mixed with the plasticizing solvent and an ionic salt. The crosslinking step is carried out essentially without evaporation of the plasticizing solvent. The plasticizing solvent also aims at improving the ionic conductivity of the obtained polymeric gel electrolyte, in particular at low operating temperatures.

The first object of the present invention is to provide a metallic lithium rechargeable electrochemical accumulator comprising at least one electrode of the metallic lithium type and at least one polymeric gel electrolyte, this accumulator being able to operate essentially without formation of dendrites on the entire surface of the electrode of the metallic lithium type present in said accumulator.

This accumulator is characterized by its ability to operate at temperatures comprised between −20° C. and 60° C., essentially without formation of lithium dendrites on the entire surface of the electrode of the metallic lithium type.

Preferably, this rechargeable accumulator is designed so that, after 100 cyclings, the formation of lithium dendrites occurs only over less than 1% of the total surface of the electrode of the metallic lithium type.

The stability of the accumulator with respect to the dendrites is evaluated by calculating changes in the accumulator's coulombic efficiency over cycles. This is done by alternately running charge and discharge tests. It is considered that there is no dendrite formation when the coulombic efficiency remains between 90% and 100%. When this efficiency drops below 90%, some parasitic phenomena appear in the accumulator structure. An efficiency of above 100% means dendrites have formed. The contaminated surfaces are then measured and the surface area covered with dendrites is quantified using a scanning electron microscope.

Also preferably, the rechargeable accumulator according to the invention is designed to exhibit a level of cycling stability such that, after 200 cycles, lithium dendrites formed occupy less than 1% of the total surface of the electrode of the metallic lithium type.

According to an advantageous embodiment for the present invention, the accumulator comprises at least three films. The first film constitutes a positive electrode. The second metallic lithium-based film constitutes a negative electrode, while the third film acts as a separator between the positive electrode and the negative electrode.

In this accumulator, the film constituting the positive electrode is advantageously made of a film of $LiFePO_4$, $LiCoO_2$, $LiNiO_2$, $Li_4Ti_5O_{12}$ or a mixture of these compounds. Still more advantageously are positive electrodes in which the film is made from a mixture of at least two of the compounds $LiCoO_2$, $LiNiO_2$, $LiFePO_4$ and $Li_4Ti_5O_{12}$.

The lithium-based negative electrode is preferably constituted of a film made of metallic lithium and/or a lithium-rich intermetallic alloy mixture such as a lithium-aluminum, lithium-steel, lithium-Sn or lithium-Pb mixture. An example is a lithium-rich intermetallic alloy mixture comprising about 8% aluminum.

The separator is advantageously constituted of a film selected from the group consisting of polyethylene, polypropylene, polyether and polyethylene/polypropylene films.

Also preferably, the rechargeable electrochemical accumulator according to the invention is designed to operate at between 1.5 and 5 volts. The operating voltage depends on the material used. For example, with $LiFePO_4$ it is in the order of 3.5 volts, with $LiCoO_2$ it is in the order of 3.7 volts, with $Li_4Ti_5O_{12}$ it is in the order of 1.5 volts and with $LiNiO_2$ it is in the order of 3.8 volts.

According to the invention, a polymeric gel electrolyte fills not only the cavities inside the accumulator between the electrodes and the separator, but also the porosities existing inside the electrodes and the separator.

This polymeric gel electrolyte is advantageously obtained by crosslinking an electrochemical composition comprising at least part of one or more crosslinkable polymers present in a crosslinkable polymer/plasticizing solvent/lithium salt mixture. The crosslinking is done with or without crosslinking facilitators, preferably in situ, after assembling the rechargeable electrochemical accumulator. Practically, the crosslinkable polymer used is advantageously in solid or liquid form, and the lithium salt is advantageously in solid form, for example a powder.

The plasticizing solvent in liquid form has the function, notably, of dissolving the crosslinkable polymer and increasing the polymeric gel electrolyte electrochemical conductivity as well as its plasticity.

According to an advantageous variant, crosslinking of the electrochemical composition is carried out in the presence of at least one organic and/or inorganic additive capable of improving mechanical properties such as the mechanical strength of the separator between the electrodes and/or the safety of electrochemical systems in which the polymeric gel electrolyte is present.

The crosslinkable polymer is preferably selected from the group consisting of four-branched crosslinkable polymers. This crosslinkable polymer is then found alone or in combination with another polymeric or nonpolymeric component.

The four-branched crosslinkable polymer preferably has hybrid end-groups. The considered hybrid end-groups include acrylate hybrid end-groups (preferably methacrylate), alkoxy hybrid end-groups (preferably alkoxy groups with 1 to 8 carbon atoms, more preferably methoxy or ethoxy groups), or even vinyl hybrid end-groups. At least one of the branches of the four-branched polymers, preferably at least two branches of the selected polymers, should be capable of giving rise to crosslinking.

Such four-branched polymers are described in detail in U.S. Pat. No. 6,190,804 as well as in application PCT WO 03/063 287. The content of these two documents is incorporated herein by reference.

The crosslinkable polymer may advantageously be associated with at least one component selected from the following groups:
poly(vinylidene fluoride)s, also called PVDFs, of formula $(CH_2-CF_2)_n$, where n advantageously varies between 150 and 15,000, preferably n is greater than 1500 and less than 4000, more preferably n is close to 2300; among these polymers are preferred those with a mean molecular weight between 10,000 and 1 million, more preferably a mean molecular weight between 100,000 and 250,000;

poly(vinylidene fluoro-co-hexafluoropropene) copolymers, also called PVDF-HFPs, of formula $[(CH_2-CF_2)_x(CF_2-CF(CF_3))_{1-x}]_n$, where n varies between 150 and 15,000, preferably n varies between 1500 and 4000, more preferably n is close to 2300; x preferably varies between 0.92 and 0.85; among these polymers are preferred those with a mean molecular weight between 10,000 and 1 million, more preferably a mean molecular weight between 100,000 and 250,000;

poly(tetrafluoroethylene)s, also called PTFEs, of formula $(CF_2-CF_2)_n$, where n varies between 5 and 20,000, preferably n varies between 50 and 10,000; among these polymers are preferred those with a mean molecular weight of between 500 and 5 million, more preferably a mean molecular weight of between 5000 and 1,000,000, preferably around 200,000;

poly(ethylene-co-propylene-co-5-methylene-2-norbomene)s or ethylene propylene diene copolymers, also called EPDMs, preferably those with a mean molecular weight between 10,000 and 250,000, more preferably between 20,000 and 100,000;

polyols such as:
  polyvinyl alcohols, preferably with a mean molecular weight between 50,000 and 1 million, or a cellulose, preferably with a mean molecular weight between 5000 and 250,000 with some of the OH groups being replaced by $OCH_3$, $OC_2H_5$, $OCH_4OH$, $OCH_2CH(CH_3)OH$, $OC(=O)CH_3$, or $OC(=O)C_2H_5$ groups, and/or
  ethylene oxide condensation products, preferably with a mean molecular weight between 1000 and 5000, preferably pure or mixed with propylene oxide on glycerol or trimethylolpropane, and possibly crosslinked by a di- or tri-isocyanate of formula $(O=C=N)_x-R$, where $2<x<4$ and R is an aryl or alkyl group assuring polyfunctionality with the $(O=C=N)_x$ group;

poly(methylmetacrylate)s, also called PMMAs, of formula $[(CH_2-C(CH_3)/(CO_2CH_3)]_n$, where n preferably varies between 100 and 10,000, more preferably n varies between 500 and 5000; among these polymers are preferred those with a mean molecular weight between 10,000 and 1 million, more preferably a mean molecular weight between 50,000 and 500,000;

poly(acrylonitrile)s, also called PANs, of formula $[CH_2-CH(CN)]_n$, where n varies between 150 and 18,800, more preferably n varies between 300 and 4000; among these polymers are preferred those with a mean molecular weight between 10,000 and 1 million, more preferably a mean molecular weight between 20,000 and 200,000;

$SiO_2-Al_2O_3$ oxides; and nano-$TiO_2$ particles coated or not with an organic material that is preferably compatible, i.e. stable and/or not generating any parasitic secondary reaction.

The criteria used to optimize the choice of the polymeric gel electrolyte used in the frame of the present invention are:
low vapor pressure;
good compatibility with metallic lithium;
good compatibility with ceramic, glass, inorganic and/or organic-type additives, preferably added before crosslinking;
good ionic conductivity; and
large electrochemical window of operation, advantageously from 0 to 5 volts.

The plasticizer/four-branched polymer ratio, expressed in weight, preferably varies between 95/5 and 5/95. The quantity of initiator expressed as a function of the quantity of crosslinkable polymer is 100 to 5000 ppm, preferably between 500 and 1500 ppm.

It is to be noted that the ionic conductivity of the polymeric gel electrolyte varies as a function of the plasticizer/crosslinkable polymer ratio. The safety of the battery is also a function of this ratio.

According to an advantageous embodiment, the quantity of crosslinkable polymer represents between 1% and 95%, preferably between 5% and 50%, more preferably around 10% of the quantity, in weight, of the electrolytic composition undergoing crosslinking.

The lithium salt used to prepare the polymeric gel electrolyte is advantageously of the type $LiBF_4$, $LiPF_6$, LiTFSI, LiBETI, LIFSI, or a mixture of at least two of these compounds. More preferably, the lithium salt is selected from the group consisting of LiTFSI, LiFSI and mixtures of LiTFSI and of LiFSI.

The lithium salt present in the liquid electrolytic solution represents a molar quantity of 0.5 to 2.5, preferably 1 to 1.7, with respect to the quantity of plasticizer.

The plasticizing solvent used to prepare the polymeric gel electrolyte may, for example, be selected from the group consisting of gamma-buturolactone (γ-BL), tetrasulfonoamine (TESA), propylene carbonate (PC), ethylene carbonate (EC) and mixtures of these compounds.

The plasticizing solvent may also be constituted of a mixture, for example a mixture of at least two solvents selected from the group consisting of γ-BL, TESA, PC and EC.

The plasticizing solvent may also be selected from ternary mixtures of the group consisting of γ-BL+EC+PC, γ-BL+EC, γ-BL+PC, TESA+PC et γ-BL+TESA+PC+EC, for example in a (3:1:1) ratio.

According to a particularly advantageous embodiment, the polymeric gel electrolyte is constituted of, in weight:
  about 10% of the four-branched ERM-1 ELEXCEL™ polymer marketed by DKS; and
  about 90% of 1.5-molar LiTFSi in EC+γ-BL with a (1:3) ratio.

The electrochemical accumulator of this invention advantageously comprises at least one crosslinking agent added to the crosslinkable polymer/plasticizing solvent/lithium salt mixture. This additive is organic and/or inorganic and is selected such that it improves the mechanical properties of the accumulator, such as the mechanical strength of the separator between the electrodes and/or the operating safety of the accumulator. Examples of such additive are titanium oxides, aluminum oxides and mixtures of at least two of these oxides. Such additives are generally present in the crosslinkable composition at less than 10%, preferably less than 5%, in weight.

According to a variant of the invention, crosslinking of the crosslinkable polymer is carried out using a crosslinking agent, preferably selected from the peroxycarbonate group. More particularly, crosslinking is carried out using benzoyl peroxide. The concentration of the crosslinking agent is 500 to 5000 ppm/polymer, preferably 1000 to 3000 ppm, more preferably around 2000 ppm.

According to another advantageous embodiment, crosslinking of the crosslinkable polymers is carried out between 20° C. and 90° C., preferably between 45° C. and 80° C., more preferably at ambient temperature.

To obtain a polymer electrolyte with the desired gel consistency, crosslinking of the crosslinkable polymer is advantageously carried out for between 15 minutes and 72 hours, preferably for between 1 and 48 hours, more preferably for about 24 hours.

Crosslinking can be achieved using various energy sources, for example by use of electron beam irradiation, ultraviolet, infrared or thermal rays, or by use of at least two of these techniques.

An infrared emitter or thermal source may be advantageously used. Electron beam crosslinking may also be successfully performed without using any crosslinking agent.

Infrared crosslinking causes heating of the electrolytic composition, which allows, in particular, the formation of a stable lithium passivation film, particularly during battery cycling.

The second object of the present invention is to provide a process for preparing the highly stable rechargeable electrochemical accumulator defined above.

This process advantageously comprises a formation step for a metallic lithium film and/or a film of a lithium-rich intermetallic alloy mixture by lamination or extrusion. The film thus obtained acts as a negative electrode in the accumulator. The extrusion technique alone, with the necessary adjustments of the dimensions of the extrudate exiting the die, also produces a suitable electrode film.

This process also advantageously includes a preliminary step in which the metallic lithium and/or lithium-rich intermetallic alloy mixture, initially in solid form such as blocks, bars, granules, etc., is extruded before undergoing lamination. Moreover, it is advantageously performed in an anhydrous chamber and/or preferably in the presence of a noble gas such as argon.

Therefore, this process comprises a step in which a film of metallic lithium and/or lithium-rich intermetallic alloy mixture is deposited by lamination, preferably without support but optionally on an electrode support, advantageously nickel-based, with formation during lamination of a passivation layer on the lithium film.

The usable extrusion and lamination techniques are described in American U.S. Pat. No. 6,517,590.

It is important that the lamination of the lithium film is performed at approximately the same temperature as that used for the preliminary extrusion of the lithium.

Advantageously, the process according to the invention enables the preparation of a stable metallic lithium rechargeable electrochemical accumulator comprising:
  at least one electrode of the metallic lithium type covered with a lithium-based film, said lithium film being deposited on the electrode by lamination with formation, during lamination, of a passivation layer on the lithium film;
  at least one cathode; and
  at least one polymeric gel electrolyte.

The stability and remarkable long life of this accumulator is due to the fact that it operates essentially without the formation of lithium dendrites on the entire surface of the electrode of the metallic lithium type present in accumulators.

More particularly, this generator that comprises a lithium-based electrode, made of a metallic lithium film and/or a lithium-rich intermetallic alloy mixture, operates essentially without the formation of dendrites at operating temperatures between −20° C. and 60° C.

The film of lithium and/or lithium-rich intermetallic alloy mixture is advantageously prepared from the extrudate (mass exiting the extruder die) obtained by extrusion of the lithium and/or the lithium-rich intermetallic alloy mixture in solid form.

The process according to the invention is preferably carried out in an anhydrous environment and/or in the presence of a noble gas.

The lamination and extrusion temperatures are advantageously kept fairly constant throughout the lamination and extrusion steps.

According to an advantageous variant, the extrusion of the metallic lithium and/or lithium-rich intermetallic alloy mixture is carried out at a temperature between 50° C. and 100° C., and the lamination is carried out at a temperature between 5° C. and 80° C.

An important characteristic of the process according to the invention relates to the fact that the lamination and crosslinking steps are carried out at approximately the same temperature.

In the case where only the extrusion technique is used for preparing the film of the lithium type, the extrusion exit temperature and the crosslinking temperature are adjusted to be approximately the same. For example, the temperatures measured at the exit of the lithium salt extrusion may be between 70° C. and 80° C.

The difference between the lamination and the crosslinking temperatures is preferably less than or equal to 2° C. More preferably, this difference is less than or equal to 1° C.

The polymeric gel electrolyte used is advantageously obtained by crosslinking a crosslinkable mixture comprising at least one crosslinkable polymer, at least one plasticizing solvent and at least one lithium salt. Crosslinking the crosslinkable polymer is advantageously carried out after assembling the constitutive parts of the accumulator and after filling its cavities with the crosslinkable composition.

Crosslinking is advantageously of the infrared or thermal type, and is preferably carried out while exerting a pressure on the outer walls and/or inner interfaces of the accumulator in order to improve the welding of the inner interfaces. It advantageously varies between 0.1 and 75 psi.

According to another particularly advantageous variant, the preparation process for a rechargeable electrochemical accumulator according to the invention comprises at least the three preparation stages, which are:
  preparation of a first lithium film from lithium and/or a lithium-rich intermetallic alloy mixture in solid form by extrusion followed by lamination, or by extrusion alone;
  preparation of a second film applied on an electrode support to form the cathode; and finally
  preparation of a third separator film by lamination or by using Doctor Blade™ on a support.

Note that while the process is carried out, the three films are prepared one after another, in any order, or simultaneously. It is possible to proceed continuously or discontinuously.

A third object of the present invention relates to the use of the rechargeable electrochemical accumulator described above or as prepared according to the process also described above, as a current source for hybrid electric vehicles, electric vehicles and in emergency supply systems such as those of the UPS type.

Examples of use are outdoors operation and at temperatures below 0° C.

DESCRIPTION OF PREFERRED EMBODIMENTS OF THE INVENTION

An example of the preparation of the polymer matrix by crosslinking the polymer used as an electrolyte in a battery containing a metallic lithium-based anode is herein provided. The technology associated with this new type of battery can operate at low temperatures, in particular at temperatures between −20° C. and 60° C.

The process for preparing the polymeric gel electrolyte from the electrolytic composition comprises at least two steps, which are:
1. preparation of the electrolytic composition; and
2. crosslinking of the electrolytic composition.

Among the parameters that influence the preparation of the polymer electrolyte, let's mention:
3. nature of the crosslinking source;
4. nature of the additives and their effects on dendrite elimination; and
5. choice of the step in the accumulator fabrication process in which the crosslinking of the crosslinkable polymer is carried out, for example in situ during final assembly of the battery.

1—Preparation of the Electrolytic Composition

In the example provided, the electrolytic composition is prepared using at least one crosslinkable polymer and at least one liquid plasticizer capable of increasing ionic conductivity with the help of at least one salt or at least one salt mixture preferably selected from among the following:
LiTFSI or LiFSI;
a mixture of LiTFSI and LiFSI; or
a mixture of $LiBF_4$ and LiTFSI.

It turns out that the choice of liquid electrolyte is very important to the formation, in an intimate way, of a chemical and physical gel.

Some of the recommended liquid electrolytes have the following properties:
good conductivity at low temperatures (LT), that is at temperatures below 25° C. and above 0° C.;
high boiling point, preferably higher than 200° C.;
ability to form a passivation film on the metallic lithium, stable at high-density current;
low vapor pressure, preferably lower than 50 mm Hg at 120° C.; and
electrochemical window of 0 to 5 volts.

Some of the plasticizers that can advantageously be used in this context are GAMMA-BL, PC, EC and their mixtures with at least one crosslinkable polymer.

2—Crosslinking of the Electrolytic Composition

This procedure is especially important for obtaining a polymeric gel electrolyte with very good mechanical strength, which happens to ensure a very good interface between the lithium and the polymeric gel electrolyte, as well as between the polymeric gel electrolyte and the cathode. For that purpose, different crosslinking methods have been successfully used.

One of the most important aspects of the method selected is the choice of the crosslinking temperature, which preferably should be appreciably lower than the lithium extrusion temperature.

Moreover, it had been observed, unexpectedly, that a particularly stable electrochemical accumulator is obtained when the ambient temperature of crosslinking is more or less the same as the lamination temperature. It appears that this precaution allows avoiding the lithium passivation film damaging that occurs usually and results in dendrite formation, a phenomenon corresponding to the formation of $Li_2O$ and $Li_2Co_3$ layers.

In the case where only extrusion of the metallic lithium is performed, polymerization of the mixture containing the plasticizing solvent and the crosslinkable polymer is carried out at the extrusion exit temperature.

The following four techniques are advantageously used for performing the crosslinking, namely exposure to:
a) electron beam;
b) ultraviolet rays;
c) infrared rays, preferably generated by an optical source then converted in situ into a thermal source; and
d) nonoptical thermal source.

The last two processes (c, d) turned out to be the most advantageous. These crosslinking processes can be applied to the crosslinkable polymer during the electrolytic composition preparation steps, but they are preferably performed in situ in the accumulator after it has been assembled.

Surprisingly, crosslinking endows the separator (electrolyte) with physical and mechanical strength. It also prevents the lithium from forming dendrites during battery cycling, in particular on the fragile surface composed of the grain boundaries on the metallic lithium surface.

3—Nature of the Crosslinking Source

The operational characteristics of the crosslinking sources mentioned in Section 2 above are preferably:
a) Irradiation by an electron beam
When the electrolyte separator is formed from a membrane of crosslinkable polymer, the range of crosslinking doses is preferably 5 to 20 Mrad, preferably around 5 Mrad. The liquid electrolyte is introduced into the polymer membrane and ionic conductivity is ensured by the liquid polymer-plasticizer mixture. In this case, it is not necessary to use a separator such as PP or PE or a mixture of the two. Indeed, the polymer membrane acts as a separator and electrolyte at the same time.
b) Ultraviolet crosslinking
The use of this process is similar to that described in Section 3a above, with the exception that 10,000 to 50,000 ppm of a photoinitiator (1%-5% in weight/polymer) is added to the polymer to ensure crosslinking, after the polymer has been added to the crosslinkable polymer-plasticizer mixture. The UV irradiation source is in direct contact with the polymer.
c) Infrared crosslinking
This technique may be used directly or indirectly on the crosslinkable polymer, which is not the case with the techniques described in Sections 3a and 3b. The polymeric gel electrolyte is obtained after complete mixing of the polymer with the liquid electrolyte and the initiator. This mixture is then injected into the porous part of the PP or PE separator. Crosslinking is carried out by an infrared lamp operating at a temperature between 25° C. and 80° C., preferably for 24 hours, or at 80° C. for 1 hour, more preferably at 25° C. for 24 hours. In the case of indirect crosslinking, the mixture (polymer, liquid electrolyte, initiator) is injected during the battery fabrication. In this case, the electrolyte also occupies the porous spaces (porosity) in the cathode and the grain boundaries of the lithium. This type of crosslinking is carried out with the battery under pressure in order to obtain a very good interface between the lithium, the electrolyte and the electrolyte/cathode.
d) Thermal crosslinking
This crosslinking process is equivalent to that described in Section 3c, with the exception that the heat source is not optical.

4. Nature of Additives and their Effect on Dendrite Elimination

The combined use of a crosslinking source and additives of the $TiO_2$, $Al_2O_3$ or $SiO_2$ type improves the mechanical properties and ionic conductivity of the electrolyte/lithium interface.

Infrared or thermal crosslinking in the presence of $TiO_2$, $Al_2O_3$ or $SiO_2$ is used in the electrolyte fabrication process at low temperatures. Experiments performed have shown, surprisingly, the important role played by these additives, capable of improving the mechanical strength of the gel electrolyte by welding the lithium/gel electrolyte and cathode/gel electrolyte interfaces. An additional observed advantage lies in the fact that it ensures a good safety for the battery, in particular during overvoltage.

Moreover, other parameters have been found to favorably influence the conductivity of the electrolyte and the interfacial resistance of the lithium battery. Indeed, notable among the parameters that produce at the same time a very good conductivity of the gel electrolyte and low interfacial resistance is the nature of the salt, advantageously of the LiFSi or LiTFSi type and its concentration in the polymeric gel electrolyte, as well as the nature of the plasticizer, preferably present at 0.5 to 2.5 moles in the plasticizer/crosslinkable polymer mixture.

Also note that the ionic conductivity of the gel depends on the nature of the salt and its concentration, the choice of liquid electrolyte and the polymer/liquid electrolyte ratio.

The concentration of the salt is therefore advantageously selected preferably between 1 and 2 moles and the salt is preferably dissolved in a solvent of the group consisting of γ-BL, γ-BL+EC and γ-BL+PC. The crosslinking polymer/plasticizer percentage is advantageously 10/90% in weight.

A low initial interfacial resistance is obtained with γ-BL and a strong interfacial resistance is obtained with γ-BL+PC. In addition, the relationship, γ-BL<γ-BL+EC<γ-BL+PC, is verified for the interfacial resistances.

The interfacial resistance of this new type of rechargeable electrochemical accumulators remains low during long-term storage of the lithium battery at ambient temperature. This interfacial resistance is obtained according to the sequence (in descending order) γ-BL<γ-BL+PC<γ-BL+EC, where γ-BL represents the lowest value and γ-BL+EC represents the highest value.

Crosslinking Process and Battery Fabrication

Figure 1:
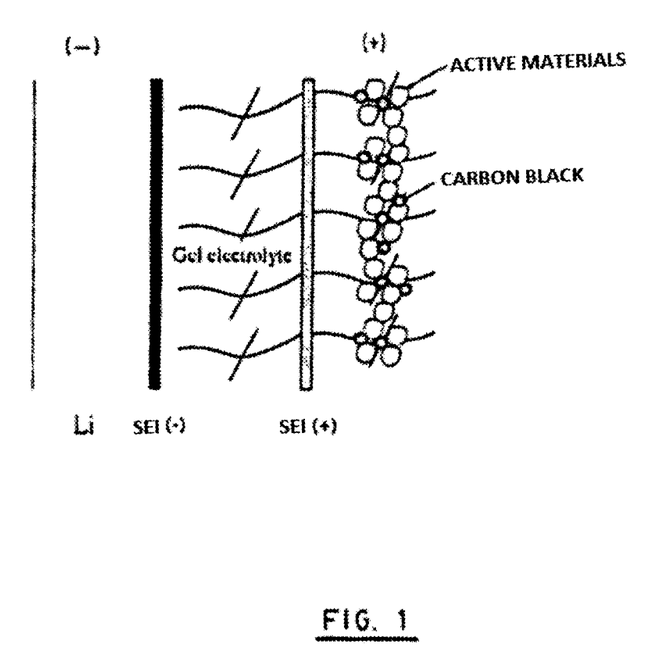
Figure 2:
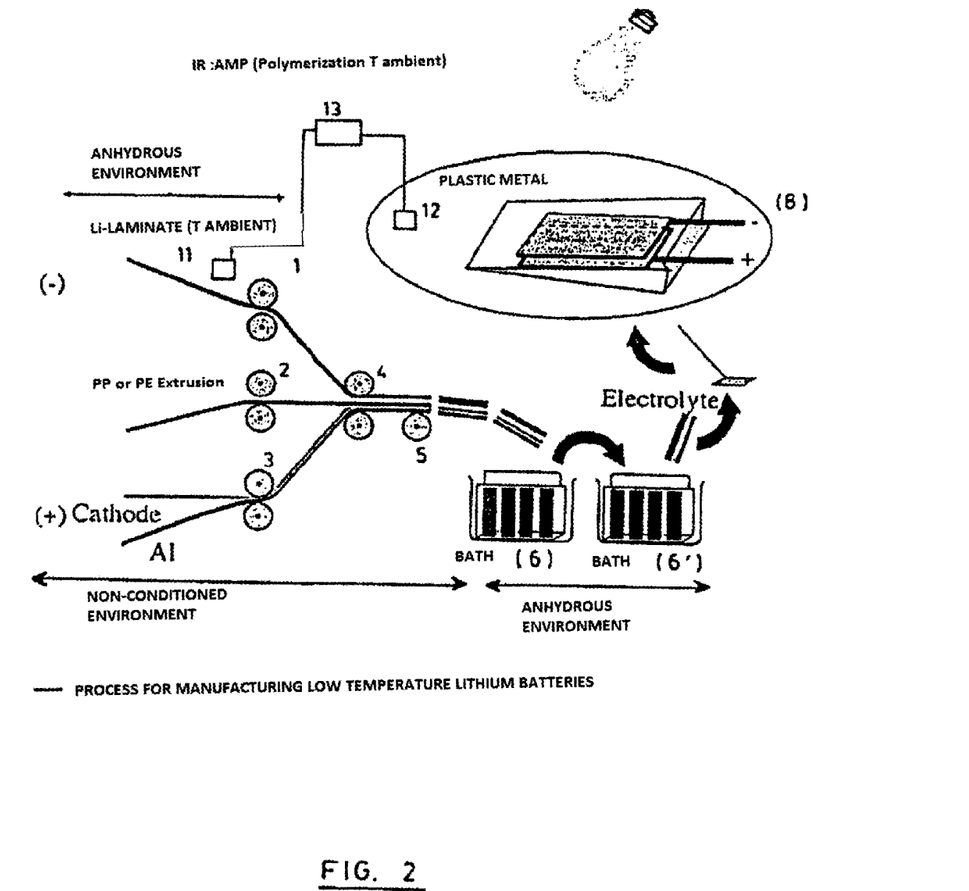
FIG. 2 is a schematic representation of a mode of use of a fabrication process for a lithium battery according to the invention wherein the extruded and/or laminated metallic lithium is used with or without a current collector.

FIGS. 1 and 2 show details of the fabrication process for a lithium battery by in situ polymerization of the polymer electrolyte by infrared (optical) or thermal lamp.

As illustrated in FIG. 2, three films are prepared simultaneously by lamination. The metallic lithium film is prepared from an extrudate of solid lithium that is laminated, optionally on an electrode support film. The separator film is prepared from an extrudate of polypropylene granules. The cathode film is laminated, optionally on a support. Upon exiting the lamination rolls (1), (2) and (3), the three films are assembled under the pressure exerted by the rolls (4) between the different. The distance between the rolls is adjusted so that micro-spaces remain between the films. These micro-spaces are filled with the crosslinkable electrolytic composition. The multilayer film is cut to the desired length using a knife not shown in FIG. 2 but positioned near the roll (5). The multilayer film sections thus obtained are soaked successively in baths (6) and (6') filled with the crosslinkable polymer/plasticizing solvent/lithium salt mixture. The soaked sections thus prepared are welded at one end, for example by ultrasound. The accumulators thus assembled are exposed to an infrared source in the heating area (8). The irradiation triggers the formation of the polymeric gel electrolyte not only inside the cavities of the accumulator, but also inside the porosities present in the electrodes and the separator film. The temperature in the area where the accumulator is exposed to infrared light is measured by a temperature sensor (12) and adjusted to match the one measured with the temperature sensor (11) indicating the lithium film lamination temperature. The adjustment is made using the temperature regulation (13). The crosslinking is stopped when the polymeric gel electrolyte has reached a gel consistency, which corresponds to a value of the degree of crosslinking in the crosslinkable polymer/plasticizing solvent/lithium salt mixture situated between 5% and 40%. Unlike a traditional solvent, the plasticizing solvent does not show substantial evaporation during the crosslinking stage and the plasticizing solvent remains trapped in the polymeric gel electrolyte structure, thereby enhancing its conductivity and plasticity.

The examples presented hereinafter are given for illustrative purposes only and shall not be interpreted as constituting any limitation on the object claimed.

Example 1—Battery with Metallic Lithium and Gel—Gel (e-beam)

The entire process for preparing the films and assembling the corresponding accumulator hereinafter used is carried out continuously in a glove box with temperature regulation and under argon, in accordance with the schematic representation shown in FIG. 2.

The fabrication of the metallic lithium extrudate by extrusion is carried out at 25° C. in the anhydrous glove box.

The metallic lithium film is prepared by extruding a bar of metallic lithium. The extrudate obtained, which is about 250-micrometer thick, is laminated to produce a continuous film about 34-micrometer thick.

The cathode is produced using $LiFePO_4$ and carbon black mixed with the poly(vinylidene fluoride) (PVDF) binder marketed under the trademark Kruha: KF-1700™, in a mass ratio of 87:3:10 in the n-methyl pyrolidone solvent.

This mixture is applied on an aluminum collector using the Doctor Blade™ method. The electrode thus obtained is dried under vacuum at 120° C. for 24 hours.

The polymer electrolyte of the four-branched polymer type marketed under the trademark ERM-1 ELEXCEL™ by the company DKS, lot 8K1201 is also prepared using Doctor Blade™, then crosslinked using an electron beam. The cathode and the polymeric separator are first soaked in the 1.5M $LiBF_4$ in EC/GBL (1:3) plasticizer-based mixture.

The metallic lithium is used as an anode, positioned facing the cathode and separated by the polymer film.

Care has been taken to perform the crosslinking of the crosslinkable polymer/plasticizing solvent/lithium salt mixture at the same temperature as that used for lamination of the metallic lithium extrudate.

An electrochemical battery with a surface area of 4 $cm^2$ is thereby obtained.

Figure 3:
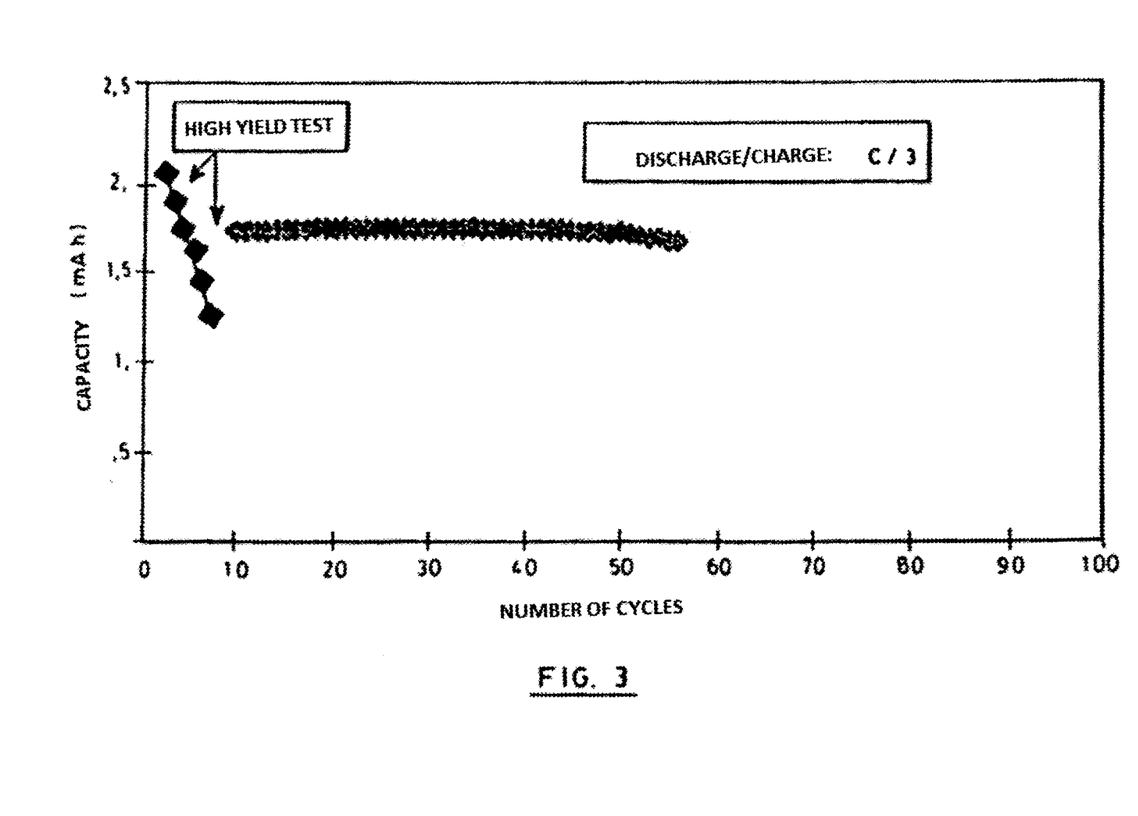
FIG. 3 is a cycling curve for a battery prepared according to the invention. It shows the stability of the metallic lithium interface that is obtained with a polymer gel prepared by the use of a process according of the invention and tested in a rechargeable accumulator produced as described in Example 1 hereinafter.

The battery is cycled at between 2.5 and 4.0 volts, at a rate of C/3. FIG. 3 shows cycling results for the battery, which retains good stability of the lithium-polymer interface after 60 cycles.

Example 2: Gel Configuration—Metallic Lithium Battery Compared to a Li-ion Battery—Gel (Thermal)

A) Metallic Lithium Battery

The cathode is prepared using the same method as in Example 1. In particular, the temperatures for extrusion of the metallic lithium, lamination of the corresponding extrudate and crosslinking of the crosslinkable polymer/plasticizing solvent/lithium salt mixture are adjusted to 25° C.

The anode is prepared from spherical natural graphite mixed with a poly(vinylidene fluoride) (PVDF) binder (Kruha: KF-1700™) and n-methyl pyrolidone in a mass ratio of 90:10. This mixture is applied on a copper collector using the Doctor Blade™ method. The graphite electrode thus obtained is dried under vacuum at 120° C. for 24 hours.

The polymer electrolyte is prepared from the ERM-1 ELEXCEL™ (four branches) mixture from DKS (lot 8K1201) with 1.5 moles of $LiBF_4$ in EC/GBL (1:3) from Tomiyama, to which is added 1000 ppm of the thermoinitiator Perkadox 16™ from the company Akzo Nobel.

The anode is produced using a 40-μm thick strip of metallic lithium laminated on a strip of metallic copper. The negative contact taps are made using ultrasound (ULTRA-WELD, AmTech Model 2000B™).

The battery is assembled by stacking the anode, Celgard® and cathode films in the following sequence: anode/Celgard®/cathode.

This configuration is inserted in a plastic metal bag and sealed. The polymer electrolyte is injected into the cell, followed by a second sealing. The battery is placed in an incubator at 25° C. for 48 hours for adequate crosslinking. Thus, the gel is formed in situ and Battery A is obtained.

B) Li-Ion Battery

This type of battery does not generally exhibit dendrite formation.

A second battery (B) is assembled the same way, also under temperature-controlled conditions, by replacing the lithium anode with a graphite-based anode. The anode is prepared by mixing spherical natural graphite with the poly(vinylidene fluoride) (PVDF) binder (Kruha™: KF-1700) and n-methyl pyrolidone in a mass ratio of 90:10. This mixture is applied on a copper collector using the Doctor Blade™ method. The graphite electrode thus obtained is dried under vacuum at 120° C. for 24 hours.

Figure 4:
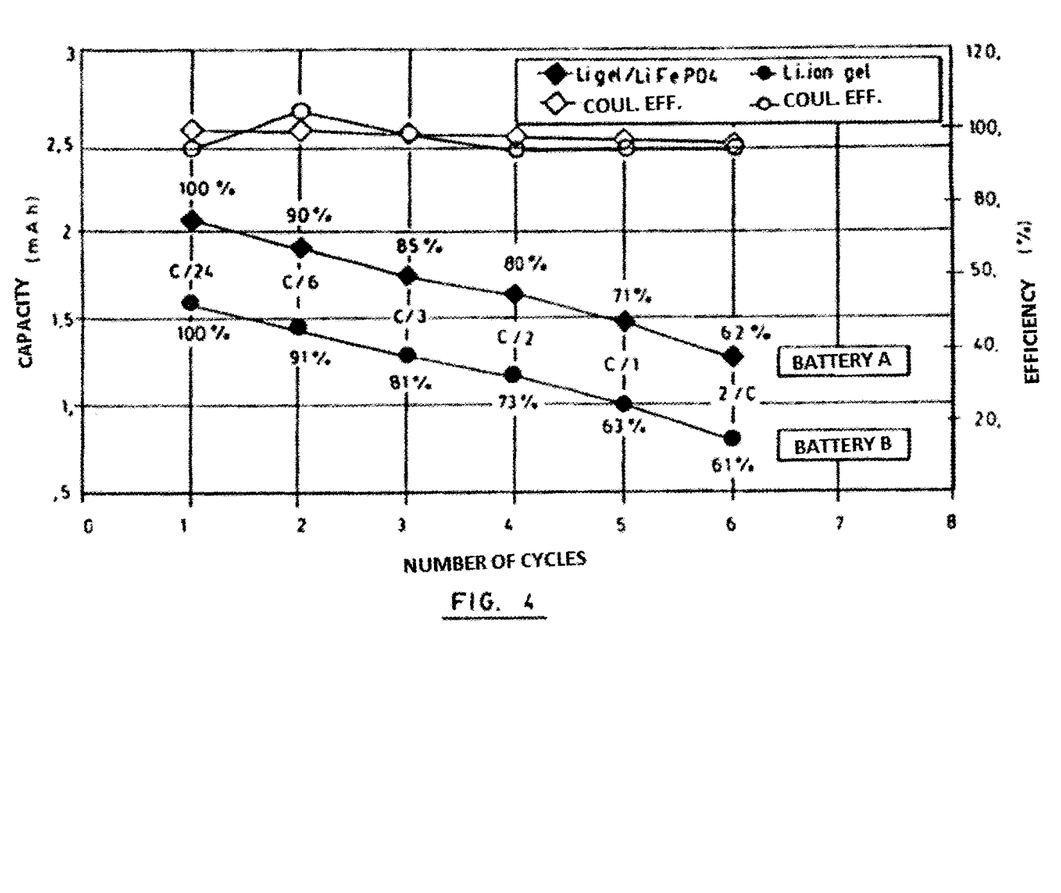
FIG. 4 is a cycling curve comparing at the high-rate discharges for a metallic lithium rechargeable battery and a lithium-ion battery using a polymeric gel electrolyte, the preparation of this battery components being described in Example 2 hereinafter.

The electrochemical validation is based on the Ragone test, which consists of a series of cycles at different discharge regimes. FIG. 4 compares results for batteries A and B.

The obtained results clearly show that the reached rechargeable capacity is higher for the lithium-metal configuration (Battery A) than for the lithium-ion configuration. This is associated with better stability of the gel interface with the metallic lithium.

Example 3—Highlighting of the Importance of Maintaining the Lamination Temperature at 25° C. and the Crosslinking Temperature at 80° C.

The process used is illustrated in FIG. 2. Lamination of the metallic lithium extrudate is carried out at 25° C.

The polymeric gel electrolyte is prepared from a mixture consisting of 10% of the four-branched ERM-1 ELECEL™ polymer marketed by the company DKS and 90% of 1.5M LiFSI in the EC+GBL (1:3) plasticizing mixture, to which are added 2000 ppm of the crosslinking agent used in Example 1.

The cathode is composed of a $LiFePO_4$ film and the separator is made of a polyethylene film.

Crosslinking of the crosslinkable polymer mixture is carried out at 80° C. for 3 hours, a temperature different from the temperature imposed during the lamination step.

Cycling conditions are 2.5 to 4 volts, with a discharge rate of C/3 and a charge rate of C/1.

Figure 5:
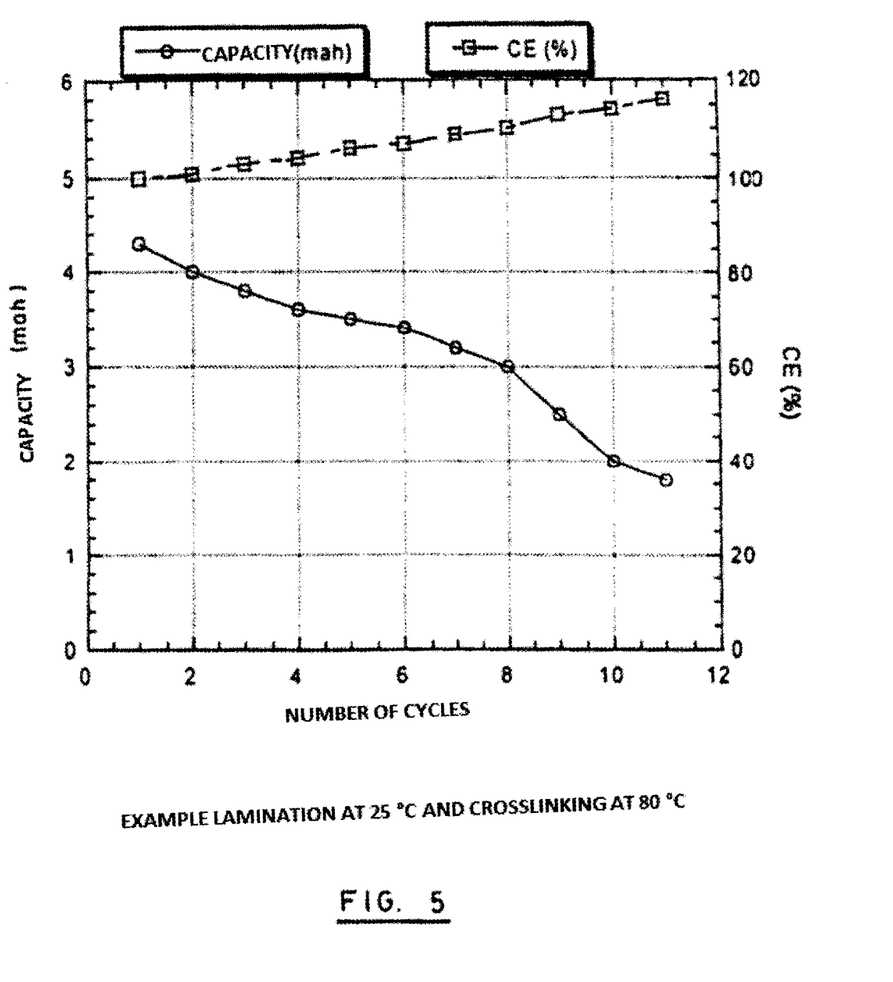
FIG. 5 is a cycling curve for a rechargeable electrochemical accumulator prepared according to the process of the invention described in Example 3 hereinafter, except that the temperature used during crosslinking of the crosslinkable polymer/plasticizer/lithium salt mixture is above the temperature used during preparation of the metallic lithium film by lamination.
Figure 6:
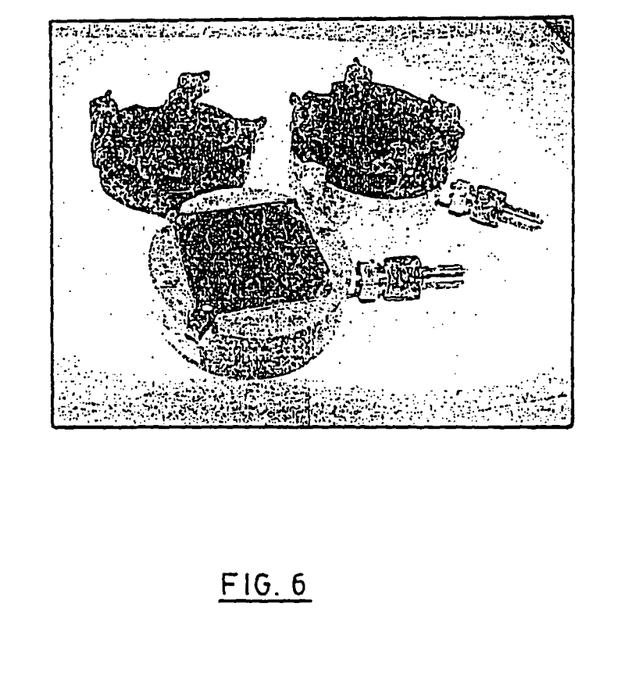

The cycling curve displayed in FIG. 5 clearly shows a rapid drop in capacity as a function of cyclability. In addition, efficiency has increased (> to 100%), an evidence of dendritic activity.

While the present invention was described using specific embodiments, it is understood that several variations and modifications may be made to said embodiments, and that the present application covers such modifications, uses or adaptations of the present invention based, in general, on the principles of the invention and including any variation of the present description that will become known or conventional in the field of activity in which the present invention is found, and that may apply to the essential elements described above, in agreement with the scope of the following claims.

The invention claimed is:

1. A method for preparing a metallic lithium rechargeable electrochemical accumulator comprising:
   at least one anode film made of metallic lithium or a lithium rich intermetallic alloy;
   at least one cathode film;
   a separator film disposed between the anode and cathode films and comprising a polymer material impregnated by a crosslinked polymer gel electrolyte;
   said method comprising:
   preparing only the lithium or only the intermetallic lithium alloy with at least two lamination rolls to obtain the anode film; and
   applying the anode film and the cathode film on the separator film,
   impregnating the separator film with an electrolyte composition which comprises a crosslinkable polymer, a lithium salt, optionally at least one additive and optionally a plastifying solvent; and
   crosslinking the electrolyte composition at a temperature between 20 and 90° C.; wherein
   a temperature difference for the steps of preparing the anode film and crosslinking of the polymer electrolyte is less than or equal to 2° C.

2. The method according to claim 1, wherein, following obtaining the anode film, the anode film, the cathode film and the separator film are assembled together by co-lamination.

3. The method according to claim 1, wherein the crosslinkable polymer is a four-branched polymer.

4. The method according to claim 1, wherein the crosslinkable polymer content in the electrolyte composition is from 1 to 95% of the electrolyte composition weight.

5. The method according to claim 1, wherein the lithium salt of the electrolyte composition is selected from $LiBF_4$, $LiPF_6$, LiTFSI, LiBETI, LIFSI and mixtures thereof.

6. The method according to claim 5, wherein the lithium salt amount is 0.5 to 2.5 molar with respect to the quantity of plasticizing solvent present in the electrolyte composition.

7. The method according to claim 1, wherein the plasticizing solvent is selected from gamma-buturolactone, tetrasulfonoamine, propylene carbonate, ethylene carbonate and mixtures thereof.

8. The method according to claim 1, wherein crosslinking is carried out in the presence of a peroxycarbonate as the crosslinking agent.

9. The method according to claim 1, wherein crosslinking is carried out in the presence of benzoyl peroxide.

10. The method according to claim 1, wherein crosslinking is carried out over 15 minutes to 72 hours.

11. The method according to claim 1, wherein crosslinking is achieved by electron beam irradiation, ultraviolet rays, infrared or thermal rays, or a combination of at least two of these techniques.

12. The method according to claim 1, wherein crosslinking is carried out by an electron beam irradiation, without addition of a crosslinking agent.

13. The method according to claim 1, wherein the anode film is prepared in an anhydrous medium and/or in the presence of a noble gas.

14. The method according to claim 13, wherein the laminating temperature is maintained substantially constant during the laminating step.

15. The method according to claim 1, wherein crosslinking is carried out via infrared irradiation or via thermal route, while exerting a pressure on the outer walls and/or the inner interfaces of the accumulator in order to improve the welding of the inner interfaces.

16. The method according to claim 15, wherein pressure exerted varies from 0.1 PSI to 75 PSI.

17. The method according to claim 1, wherein the method is carried out continuously.

18. A method of using an accumulator according to claim 1 as a current source in electric hybrid vehicles, electric vehicles or in UPSs.

19. The method according to claim 1, wherein:
a film is prepared and applied on an electrode substrate to form a cathode; and
a separator film is prepared by lamination or by Doctor Blade, optionally on a substrate.

20. The method according to claim 1, wherein the method includes forming a passivation film comprising the crosslinked polymeric gel electrolyte on a surface of the anode, the crosslinked polymeric gel electrolyte occupying space between the anode film, the cathode film and the separator and occupying cavities of the materials which form anode film, the cathode film and the separator film.

21. The method according to claim 20, wherein the passivation film is formed during lamination of the lithium or the intermetallic lithium alloy with the at least two lamination rolls.

22. The method according to claim 1, wherein the impregnation of the separator film takes place before the anode film and the cathode film are applied on the separator film.

23. The method according to claim 1, wherein the impregnation of the separator film takes place after the anode film and the cathode film are applied on the separator film.

24. The method according to claim 1, wherein the crosslinking is carried out at a temperature between 45 and 80° C.

25. The method according to claim 1, wherein the crosslinking is carried out after the anode film and the cathode film are applied on the separator film.

26. The method according to claim 1, wherein the crosslinking is carried out before the anode film and the cathode film are applied on the separator film.

* * * * *